(12) United States Patent
Bayder

(10) Patent No.: US 6,947,753 B2
(45) Date of Patent: Sep. 20, 2005

(54) DETERMINATION OF MOBILE STATION LOCATION

(75) Inventor: Gennady Bayder, Pointe Claire (CA)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 443 days.

(21) Appl. No.: 10/095,958

(22) Filed: Mar. 13, 2002

(65) Prior Publication Data

US 2004/0203841 A1 Oct. 14, 2004

(51) Int. Cl.⁷ .................................................. H04Q 7/20
(52) U.S. Cl. .................. 455/456.1; 455/437; 455/67.11
(58) Field of Search ................................ 455/436, 437, 455/439, 442, 115.3, 115.1, 456.1, 456 R, 456.3, 456.6

(56) References Cited

U.S. PATENT DOCUMENTS

| | | | | |
|---|---|---|---|---|
| 5,410,733 A | * | 4/1995 | Niva et al. | 455/437 |
| 5,563,888 A | * | 10/1996 | Parr et al. | 370/516 |
| 5,613,205 A | | 3/1997 | Dufour | 455/33.2 |
| 5,724,660 A | | 3/1998 | Kauser et al. | 455/456 |
| 5,859,839 A | * | 1/1999 | Ahlenius et al. | 370/252 |
| 5,930,713 A | | 7/1999 | Nguyen | 455/440 |
| 6,006,067 A | | 12/1999 | Rudowicz | 455/13.4 |
| 6,029,070 A | | 2/2000 | Kingdon et al. | 455/456 |
| 6,140,964 A | | 10/2000 | Sugiura et al. | 342/464 |
| 6,175,745 B1 | * | 1/2001 | Bringby et al. | 455/522 |
| 6,215,827 B1 | * | 4/2001 | Balachandran et al. | 375/262 |
| 6,246,861 B1 | * | 6/2001 | Messier et al. | 455/12.1 |
| 6,633,762 B1 | * | 10/2003 | Rauscher | 455/437 |
| 2001/0022558 A1 | * | 9/2001 | Karr et al. | 342/450 |
| 2003/0176196 A1 | * | 9/2003 | Hall et al. | 455/456.1 |
| 2004/0022214 A1 | * | 2/2004 | Goren et al. | 370/332 |

FOREIGN PATENT DOCUMENTS

EP  1 033 582  9/2000

* cited by examiner

Primary Examiner—CongVan Tran
(74) Attorney, Agent, or Firm—Ericcson Canada Inc.

(57) ABSTRACT

A system, method and processing unit for mobile station location determination. Mobile Assisted Handoff (MAHO) measurements are sent to the processing unit that also retrieves the corresponding transmitted signal strengths and electromagnetic field distribution functions for the relevant base stations. The location of the mobile station is then determined by minimising the following formula:

$$F(\gamma, x, y) = \sum_{j=1}^{m} M(P_{Rj} - \gamma \cdot P_{Tj} \cdot G_j(x, y))$$

where m is the number of relevant base stations, M is an optimisation metric (such as $(\epsilon_j)^2$ or $|\epsilon_j|$) $P_{Rj}$ is received signal strength, $P_{Tj}$ transmitted signal strength, $\gamma$ attenuation (e.g. in the mobile station), and $G_j(x,y)$ the electromagnetic field distribution function.

11 Claims, 3 Drawing Sheets

DETERMINATION OF MOBILE STATION LOCATION

BACKGROUND OF THE INVENTION

1. Field of the Invention

The present invention relates generally to mobile telecommunications, and in particular to determination of the location of a mobile station.

2. Description of the Related Art

It is often desired or necessary to be able to determine the location of a mobile station in a mobile telecommunications network. Examples are when a subscriber wishes to use location dependent services, e.g. "connect me to the closest pizza restaurant", or when a subscriber makes an emergency call (such as 911). Especially in the latter case, it may be crucial for the operators to be able to determine the location of the mobile station, such as for example if the caller does not know the location or if he suffers a heart attack and is unable to respond at all. For these and other reasons, several methods and systems for mobile station location determination have been developed.

In U.S. Pat. No. 6,140,964, Sugiura et al. present a solution in which a neural network is used to determine the location. The neural network has an input layer that receives the radio signal strength from a number of base stations, one per input port in the input layer. The neural network learns the correlation between the signal strengths and the mobile station location and is then able to estimate the location once this correlation has been made. The system can of course fine-tune the correlation later on. Disadvantages of this solution is that the system must learn the correlation, i.e. someone must initiate the system by taking a mobile station and making measurements, and that the system is vulnerable to changes in base station placements, i.e. if a base station moves, the system has to be re-educated.

Global Positioning System (GPS) coordinates are used for positioning in many systems, either on their own or in combination with other positioning techniques as the one mentioned hereinbefore. In U.S. Pat. No. 5,724,660 Kauser et al. present a method and an apparatus wherein GPS coordinates are compared with the calculated location area to increase the accuracy of the location determination. A first disadvantage of this solution is that the mobile station must comprise a GPS receiver/processor that among other things increases the price of the mobile station. A second disadvantage is that the solution relies on a system that usually is not owned or controllable by the company that performs the location calculations which introduces a certain uncertainty.

Rudowicz, U.S. Pat. No. 6,006,067, and Grayson et al., EP-1,033,582 A1, both present solutions using signals from orbiting satellites. The signals are measured and straight calculations are performed using the results of the measurements, e.g. angle a is calculated according to a certain formula and the angle is used together with other results to give one answer to the location of the mobile station. A disadvantage of this approach is that the measurements are not free from errors, which means that there will be errors in the results, and it is impossible or difficult to know how good the estimate is.

Nguyen, U.S. Pat. No. 5,930,713 states that there are many known methods to determine mobile station position, such as for example using signal strength or timing advance measurements made by the mobile station, but Nguyen fails to disclose any details about these methods. Similarly, Dufour, U.S. Pat. No. 5,613,205, uses signal strength measurements to calculate the distance from each base station and calculates the intersection point of the resulting arcs. However, Dufour does not explicitly show the calculations behind the distance determination, nor does he address some problems, such as bad data as will be shown hereinafter, in the calculation of the intersection points.

Messier, U.S. Pat. No. 6,246,861, uses a channel model equation with a path loss exponent to determine the distance between a base station and the mobile station. Problems with this solution are that the channel model may be inferior to the free space propagation model, that the path loss exponent usually varies with the distance, and that the resulting equations need to be solved for distance and path loss exponent. In many cases, a method with a path loss exponent makes the calculations more complex than necessary.

It can thus be appreciated that it would be advantageous to have solution for mobile station location determination that overcomes disadvantages of the prior art. This invention provides such a solution.

SUMMARY OF THE INVENTION

In one aspect, the present invention is a method for mobile station location determination. A processing unit retrieves mobile station received signal strength measurements for signals sent from a plurality of base stations, and the transmitted signal strength value and the electromagnetic field distribution model function corresponding to each of the plurality of base stations. Then it sets up an estimation error function with, for each of the plurality of base stations, the transmitted signal strength, received signal strength, and electromagnetic field distribution model function, calculates the global minimum of the estimation error function, and communicates the solution to the global minimum.

In another aspect, the present invention is a system for mobile station location determination. The system further comprises a plurality of base stations that transmit signals to the mobile station. The system further comprises a processing unit that retrieves mobile station received signal strength measurements of signals sent from the plurality of base stations, the transmitted signal strength value and the electromagnetic field distribution model function corresponding to each of the plurality of base stations. The processing unit sets up an estimation error function with, for each of the plurality of base stations, the transmitted signal strength, received signal strength, and electromagnetic field distribution model function, calculates the global minimum of the estimation error function, and communicates the solution to the global minimum.

In yet another aspect, the present invention is a processing unit for determining mobile station location. The processing unit comprises a communication unit that receives received signal strength measurements of signals sent from a plurality of base stations from the mobile station, forwards the measurements to a processor, and communicates a global minimum. The processing unit further comprises a processor that, upon reception of the received signal strength measurements and the transmitted signal strength values, retrieves the transmitted signal strength value and the electromagnetic field distribution model function corresponding to each of the plurality of base stations, and sets up an estimation error function with, for each of the plurality of base stations, the transmitted signal strength, received signal strength, and electromagnetic field distribution model function, calculates the global minimum of the estimation error function, and sends the solution to the global minimum to the communication unit.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION OF THE PREFERRED EMBODIMENTS

Figure 1:
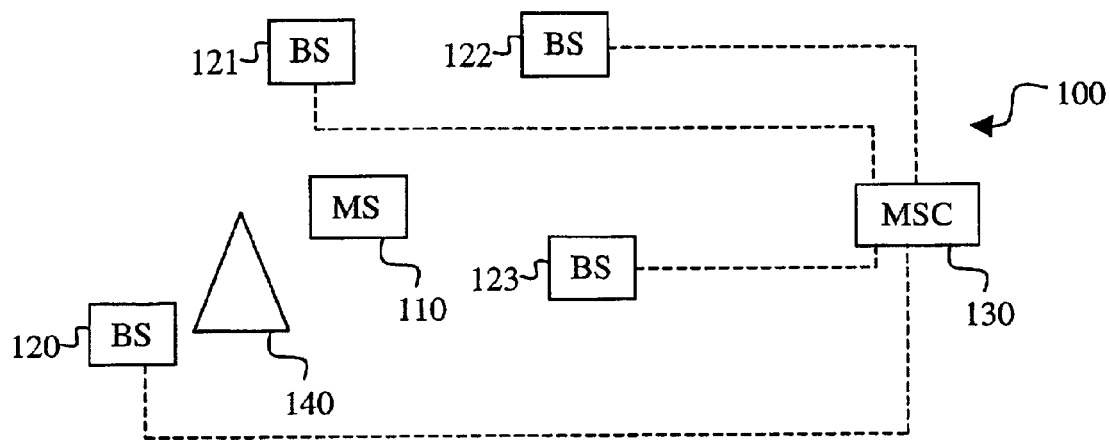
FIG. 1 is a block diagram of a cellular telephone system.

The innovative teachings of the present invention will be described with particular reference to numerous exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views, and the various elements depicted are not necessarily drawn to scale.

FIG. 1 is a block diagram of an exemplary cellular telephone system 100 showing a mobile station (MS) 110 and a number of base stations (BSs) 120–123. The base stations 120–123 are connected to a Mobile Switching Centre (MSC) 130, normally through landlines, indicated by dotted lines. The system 100 has access at the base stations 120–123 to received signals sent from the mobile station 110, and the mobile station 110 has access to received signals sent from the base stations 120–123.

Mobile Assisted Handoff (or Handover, MAHO) is a technique, well known in the art, which now will be described starting with some basic concepts:

1. Upon power up, a mobile station seeks a frequency of any control channel sent by a radio base station in the network. The mobile station receives from the base station, through this channel, a list of control channels of neighbouring cells.
2. According to the received list, the mobile station can retune to the control channel of another base station in order to improve reception. One control channel is capable of servicing all mobile stations, which are in guard mode in the serving area of the cell. The power emitted by a base station on the control channel is constant, which is not the case for the power on the voice channels.
3. For an incoming or outgoing call, provided that the connection is successful, the mobile station seizes a voice channel, i.e. in some systems the mobile station uses e.g. a frequency and a time slot, which are specified by base station. Over the voice channel, the mobile station continues to exchange control data as well as coded speech with the base station. This way, the mobile station is able to continuously update the list of control channels frequencies of neighbouring cells.
4. During a speech connection the mobile station performs the following operations:
    retunes on the uplink frequency and transmits one time slot
    retunes on the downlink frequency and receives one time slot
    retunes on one of the frequencies from the list of control channels and measures a signal strength received from the neighbouring cell.

The signal strength measured on the control channels of neighbouring cells is used for handoffs. The mobile station transmits the signal strength data to the base station. During a speech connection, the base station always has the data measured by mobile station on the neighbouring cells frequencies.

This technique is Mobile Assisted Handoff (MAHO). As long as the base station has MAHO data, a corresponding Mobile Switching Centre (MSC) or Base Station Controller (BSC) can request it. The MAHO data can then be forwarded to a processor for location computations.

In free space with absolutely accurate MAHO data (without noise and round off), mobile station location is an easy task, since the MAHO measurements are error free, which would mean that the calculations would result in the exact position for the mobile station. The same would hold true for a model that exactly simulates the real world, but as this is not possible, errors enter into the less than perfect model.

On source of errors is that objects, such as the mountain 140 in FIG. 1 as will be seen in more detail hereinafter, may attenuate the propagation of the signal between a base station 120 and the mobile station 110, in which case the signals the mobile station 110 receives are weaker than they should be according to the model. If the nature of the surroundings is such that there are many sources of errors, then it may be better to resort to a location method that uses measurements from previous tests, such as for example in Sugiura, to estimate the location of the mobile station 110. However if no test measurements exist, then the method according to the invention is better than nothing.

Before going into details about the system and method for mobile position location determination, the mathematical model will be described.

As a service area is significantly smaller than the Earth, it can be approximated by a plane in which Cartesian coordinates (x,y) can be introduced. A conversion from geographical coordinates (latitude, longitude) to Cartesian ones (x,y) and vice versa is well known as geographical mapping.

To simplify, let us at first assume that there is, on the plane (x,y), only one antenna that emits an electromagnetic field, commonly described by Maxwell's laws. The Poynting vector, R, is often considered as the most important energy characteristic of the electromagnetic field:

$$R = \frac{c}{4 \cdot \pi} \cdot E \times B$$

where
  R is the Poynting vector,
  E is a vector of the tension of electrical field,
  B is a vector of the tension of magnetic field, and
  c is the speed of light.

The modulus $\|R\|$ of the Poynting vector defines the density of energy of electromagnetic field in a certain point of space. If we assume that the electromagnetic field propagates in free space, then, according to the law of conservation of energy, the modulus of the Poynting vector declines in inverse ratio to the square of the distance. This law can be presented in an integral form, i.e. with power instead of energy and an antenna of a real size instead of a mathematical point:

$$P_R^{ref} = P_T \cdot \frac{S_{ant}}{4 \cdot \pi \cdot d^2} = P_T \cdot \frac{S_{ant}}{4 \cdot \pi \cdot (x^2 + y^2)}$$

where $S_{ant}$ is the effective size of receiver's antenna, $P_R^{ref}$ is the power received by the reference receiver, $P_T$ is the power emitted by the transmitter in the receiver's direction, and d is the distance between the transmitter's and the receiver's antennas.

If both antennas lie in the plane (x,y) then $d^2 = (x^2+y^2)$, where x and y are coordinates with reference to the transmitter's antenna.

Assuming that the reference receiver has an antenna of size $S_{ant} = 4 \cdot \pi$, then the formula for free space propagation reduces to:

$$P_R^{ref(4\pi)} = P_T \cdot \frac{1}{(x^2+y^2)} = P_T \cdot G(x,y)$$

where $P_R^{ref(4\pi)}$ is the power received by the reference receiver with an effective antenna size of $S_{ant} = 4 \cdot \pi$, and G(x,y) is a function that depicts the distribution of electromagnetic energy in the space and it has the same physical meaning as modulus $\|R\|$ of the Poynting vector, i.e.:

$$G(x,y) = \frac{1}{(x^2+y^2)} \sim \|R\|$$

The function G(x,y) presented above models the emission of an unidirectional antenna, i.e. an antenna that emits the same power in all directions. Other antenna patterns must be modelled by appropriate functions. There are a number of different functions G(x,y), of which four of the most typical ones will be presented herein as examples. In the following examples x and y are coordinates with reference to the base station, i.e. the transmitting antenna.

A first function models a cardioid antenna pattern:

$$G_1(x,y) = \frac{1}{2} \cdot \left(1 + \frac{x}{\sqrt{x^2+y^2}}\right) \cdot \frac{1}{x^2+y^2}$$

A second function models a circular lobe antenna pattern where the antenna is at the edge of the circle:

$$G_2(x,y) = \frac{x}{(x^2+y^2)^{3/2}} \text{ if } x \geq 0$$

$$G_2(x,y) = 0 \text{ if } x < 0$$

A third function models an ellipse antenna pattern with the antenna in the centre:

$$G_3(x,y) = \frac{\frac{b}{a}}{\sqrt{\left(\left(\frac{b}{a}\right)^2 \cdot x^2 + y^2\right) \cdot (x^2+y^2)}}$$

where a and b are major and minor semiaxes of ellipse (a>b)

A fourth function models an ellipse antenna pattern with the antenna somewhere inside ellipse along the x axis:

$$G_4(x,y) = \sqrt{\frac{\left(\frac{b}{a}\right)^2 \cdot ((k \cdot x)^2 + y^2)}{\left(\frac{b}{a}\right)^2 \cdot (k \cdot x)^2 + y^2}} \cdot \frac{1}{x^2+y^2}$$

where a and b are major and minor semiaxes of ellipse (a>b); and k (0<k<1) describes the position of antenna in ellipse.

If the transmitter's antenna is located in a high position, such as for example on a skyscraper or mounting, this can also be taken into account as in the following exemplary function:

$$G(x,y) = \frac{1}{(x^2+y^2+h^2)}$$

where h is the height of antenna over the plane (x,y).

A person skilled in the art will appreciate that h can be introduced in the other functions hereinbefore in a similar manner, and that h often can be ignored for large values of x and/or y.

Assuming now that a mobile station is used instead of the reference receiver, then the power received by the mobile station is defined as:

$$P_R = \gamma \cdot P_R^{ref(4\pi)} + \epsilon = \gamma \cdot P_T \cdot G(x,y) + \epsilon$$

where $\gamma$ is an attenuation coefficient, and $\epsilon$ is an unknown additive error.

The attenuation coefficient shows how many times less the mobile station received power is than the power received by the reference receiver. This value is the attenuation or sensibility of the mobile station. The attenuation, y, is assumed to be unknown for the following reasons:

Different manufactures produce mobile stations with different attenuation.

Different models of mobile stations and even batches of the same model have different attenuation.

The attenuation can also vary depending on the battery charge.

The assumption that the attenuation is unknown is further useful in networks where a mobile station sends to the base station a Signal Interference Ratio (SIR) instead of the Received Signal Strength Indication (RSSI).

$\epsilon$, the unknown additive error, may comprise one or more of:

zero mean additive noise, an offset due to an error in the mobile station's measurement mechanism, measurement rounding off results, variations in the radio wave propagation, and other factors, which are difficult to take into account, such as for example weather conditions, wave polarization and interference.

Inasmuch as $\epsilon$ usually comprises a large amount of non-correlated, random values, it can be considered as a Gauss distributed random value; and the mathematical theory of probability can be exploited.

$\epsilon$ can be written as follows:

$$\epsilon = P_R - \gamma \cdot P_T \cdot G(x,y)$$

i.e. $\epsilon$ is the difference between the received signal strength and the signal strength according to the theoretical model. Now, in an environment with a plurality of base stations, a set of equations is given instead of the one equation showed above:

$$\begin{cases} \varepsilon_1 = P_{R1} - \gamma \cdot P_{T1} \cdot G_1(x, y) \\ \varepsilon_2 = P_{R2} - \gamma \cdot P_{T2} \cdot G_2(x, y) \\ M \\ \varepsilon_j = P_{Rj} - \gamma \cdot P_{Tj} \cdot G_j(x, y) \\ M \\ \varepsilon_m = P_{Rm} - \gamma \cdot P_{Tm} \cdot G_m(x, y) \end{cases}$$

where m is the number of base stations, i.e. an error value is given for each base station.

The values $P_{Rj}$, $P_{Tj}$ and the functions $G_j(x,y)$ are likely to be different in each equation, but they are known. The values $\gamma$, x and y are unknown, but they are the same in all equations.

The values of $\epsilon_j$ are unknown as well; but it is known that the values of $\gamma$, x and y, for which the total value of errors $\epsilon_j$ (also called cumulative error) is minimized, give a most probable (optimum) value for the mobile station coordinates. The minimization uses a metric, of which the least squares (LS) metric probably is the most popular. This gives the target function, which is to be minimized, as:

$$F(\gamma, x, y) = \sum_{j=1}^{m} M(\varepsilon_j) = \sum_{j=1}^{m} M(P_{Rj} - \gamma \cdot P_{Tj} \cdot G_j(x, y))$$

where $M(\cdot)$ is a metric of optimisation, describing a criterion of minimum of the cumulative error as further described hereinafter, and m is the number of base stations. A requirement is that $m \geq 3$.

The function $F(\gamma,x,y)$ achieves its global minimum in the point with coordinates $(\gamma_{min}, x_{min}, y_{min})$ which defines the most probable location (and attenuation) of the mobile station under the metric $M(\cdot)$. So the position determination problem can now be seen as an optimisation problem:

$$\min F(\gamma, x, y) = \sum_{j=1}^{m} M(P_{Rj} - \gamma \cdot P_{Tj} \cdot G_j(x, y))$$

$M(\cdot)$, the metric used in the formula hereinbefore, is a criterion according to which an "optimum" of the function $F(\gamma,x,y)$ is sought. Examples of such metrics are (in these examples, $\alpha$ is a constant and $\alpha > 0$):

Least square metric:

$$\sum_{j=1}^{m} \alpha \cdot (\varepsilon_j)^2$$

Modulus $$\sum_{j=1}^{m} \alpha \cdot |\varepsilon_j|$$

Lorentzian metric $$\sum_{j=1}^{m} \log(1 + \alpha \cdot (\varepsilon_j)^2)$$

Another way to present the metric is an algorithm, an example of which is given in Messier, U.S. Pat. No. 6,246,861. It can be said that an operator $M(\cdot)$ removes extremely bad values by executing the following algorithm. The values corresponding to a certain base station or group of base stations are omitted from the calculation and if the result after omission differs greatly from the result before omission, that is a sign that the omitted values are bad and that they should be removed from the calculations.

Up to now it has been assumed that the MAHO data is given as values of the signal power $P_{Rj}$ in linear units (Watts). Some mobile telecommunication standards use a so-called Received Signal Strength Indication (RSSI), which is measured in dBm. These values can easily be translated to linear units (Watts):

$$P_{Rj} = 10^{-3} \cdot e^{\left(RSSI_j \frac{\ln(10)}{10}\right)}$$

Other mobile telecommunication standards use a relative value, so called Signal-to-Interference Ratio (SIR), which is defined by the following formula:

$$SIR_j = \frac{P_{Rj}}{P_{tot}}$$

where $P_{tot}$ is total signal strength, received by mobile station. $P_{tot}$ is unknown.

If the base station receives SIR values from the mobile station, the formula is modified slightly.

First, assume that $$\gamma' = \frac{\gamma}{P_{tot}}$$

Then, knowing that $P_{tot}$ is constant:

$$\sum_{j=1}^{m} M\left(\frac{P_{Rj} - \gamma \cdot P_{Tj} \cdot G_j(x, y)}{P_{tot}}\right)$$

$$\sum_{j=1}^{m} M\left(\frac{P_{Rj}}{P_{tot}} - \frac{\gamma}{P_{tot}} \cdot P_{Tj} \cdot G_j(x, y)\right)$$

$$\sum_{j=1}^{m} M\left(SIR_j - \gamma' \cdot P_{Tj} \cdot G_j(x, y)\right)$$

The optimisation problem is the same:

$$\min F(\gamma', x, y) = \sum_{j=1}^{m} M(SIR_j - \gamma' \cdot P_{Tj} \cdot G_j(x, y))$$

Thus, the unknown value $P_{tot}$ is not sought. These results will not give the attenuation—instead $$\gamma' = \frac{\gamma}{P_{tot}}$$

is calculated. This is a minor disadvantage, since the attenuation is not as important as the position, which can be found correctly.

Mobile station location determination according to an embodiment of the invention will now be described with reference to FIG. 2 and FIG. 3.

Figure 2:
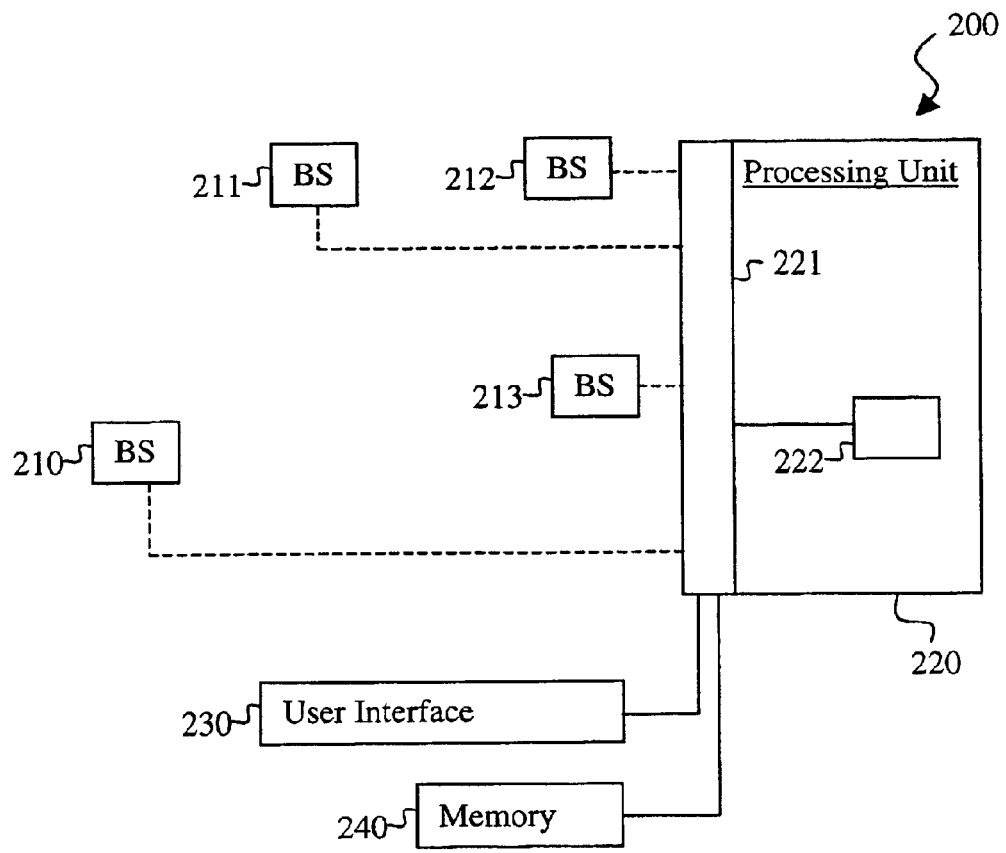
FIG. 2 is a block diagram of an embodiment of a system for mobile station location determination according to the invention.

FIG. 2 is a block diagram of an embodiment of a system for mobile station location determination according to the invention. The system 200 comprises a number, four as an example, of base stations 210–213, that are operably connected, possibly via a MSC (not shown), to a processing unit 220 with a communication unit 221 and a processor 222. The communication unit 221 is operably connected to the base stations 210–213 and to a user interface 230 or a memory 240 for presentation of the location of the mobile station.

Figure 3:
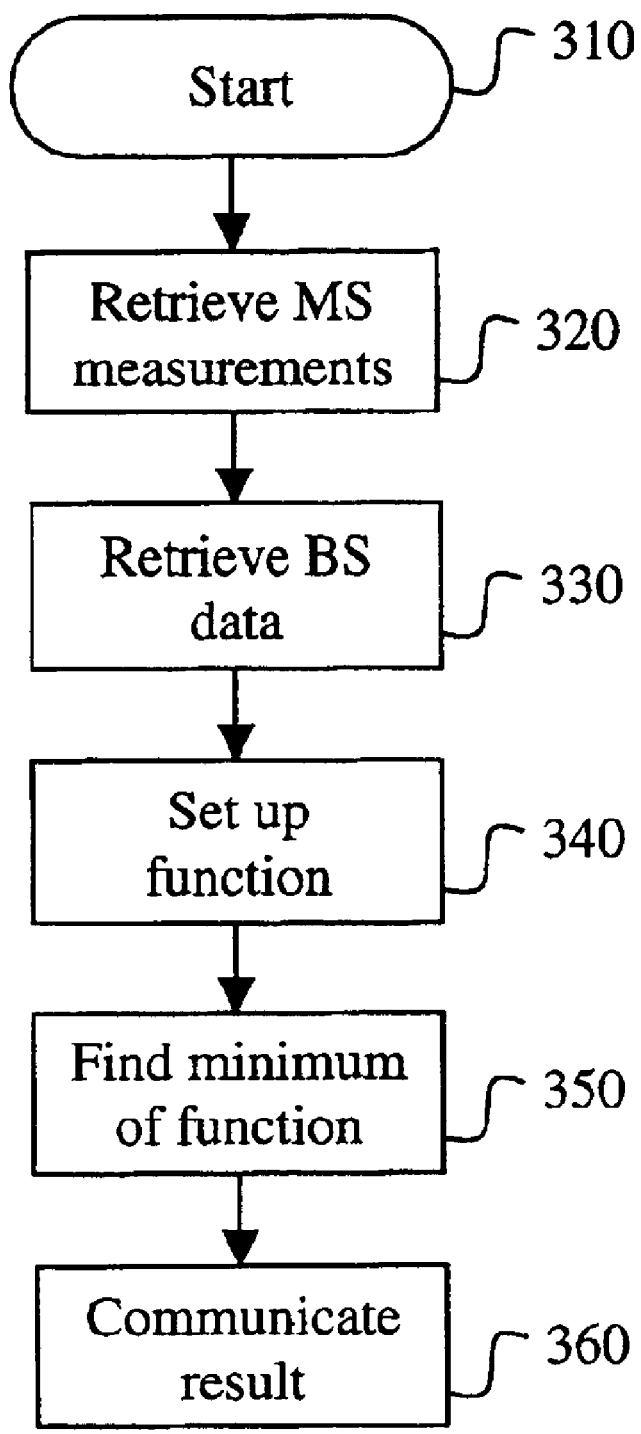
FIG. 3 is a flow chart of an embodiment of a method for mobile station location determination according to the invention.

FIG. 3 is a flow chart of an embodiment of a method for mobile station location determination according to the invention. Before using the method, initial data has to be entered. This data comprises:

a unique identity of each base station in network,
the signal strengths transmitted by the base stations, and
the function of distribution of electromagnetic field G(x, y) for each base station, e.g. by choice of an antenna's pattern, orientation, geographical coordinates (latitude, longitude) and height of the antennas.

It is, of course, important to use the right coordinates for each function, i.e. a translation has to be done between the geographical coordinates, and the coordinates with regards to the G(x,y) function. How this is done is well known in the art.

At step 310, the processing unit 220 receives, e.g. via the communication unit 221, a command to locate a certain mobile station. At step 320, the system 200 retrieves the mobile station's MAHO measurements, which consist of identities of base stations and corresponding signal strength measurements. At step 330, the base stations' transmitted signal strengths, $P_{Tj}$, and electromagnetic field distribution model functions, $G_j(x,y)$, are retrieved from where this information is stored, such as for example in the memory 240. At step 340, the function to be minimized is set up, as described hereinbefore. The global minimum to the function is calculated in step 350.

Finding the global minimum can be achieved using any well-known method, such as for example the Monte Carlo method or Conjugate Gradient methods.

Finally, at step 360, the processor 222 hands the result to the communication unit 221 that for example sends it to the user interface 230, after which the method is finished.

Figure 4:
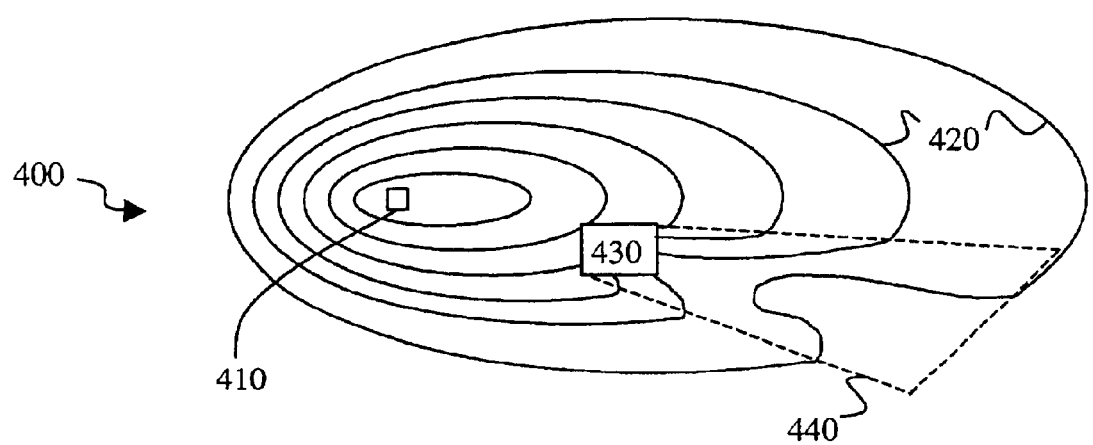
FIG. 4 shows an exemplary base station environment.

FIG. 4 shows an exemplary base station environment 400. The base station 410 has an elliptic antenna pattern, which is illustrated by a number of curves 420 (although not all of them are numbered) along which the signal strength is constant. An obstacle 430 shadows an area 440 so that the curves 420 approach the base station 410 in the shadow of the obstacle 430. If the obstacle is big enough and the signal strength in the shadow differs greatly from the signal strength according to the model, which for instance may be the case in a downtown area of a city, then the function G(x,y) can be partly tabulated in order to improve accuracy and to avoid too complicated formulas. The value of the function G(x,y) at any point in this area 440 can then be found by extrapolation from tabulated points.

As can be seen from the description hereinbefore, the invention provides a system and method for mobile station location determination that overcomes problems of the prior art.

The system and method of the present invention have been described in particular reference to certain radio telecommunications messaging standards, it should be realized upon reference hereto that the innovative teachings contained herein are not necessarily limited thereto and may be implemented advantageously with any applicable radio telecommunications standard. It is believed that the operation and construction of the present invention will be apparent from the foregoing description. The method and system shown and described have are provided as exemplary embodiments of the invention, it will be readily apparent that various changes and modifications could be made therein without departing from the scope of the invention as defined by the claims set forth hereinafter.

Although several preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for mobile station location determination, the method comprising, at a processing unit, the steps of:

retrieving received signal strength measurements of signals sent from a plurality of base stations to the mobile station;

retrieving the transmitted signal strength value and the electromagnetic field distribution model function corresponding to each of the plurality of base stations;

setting up an estimation error function with, for each of the plurality of base stations, the transmitted signal strength, received signal strength, and electromagnetic field distribution model function, the estimation error function being given by:

$$F(\gamma, x, y) = \sum_{j=1}^{m} M(P_{Rj} - \gamma \cdot P_{Tj} \cdot G_j(x, y))$$

where x and y are coordinates of the mobile station, m is the number of base stations that the mobile station measured signals from, M is a metric of optimisation, $P_{Rj}$ is received signal strength, $P_{Tj}$ is transmitted signal strength, $\gamma$ is an attenuation factor and $G_j(x,y)$ is the electromagnetic field distribution model function;

calculating a global minimum of the estimation error function; and communicating the solution to the global minimum.

2. The method of claim 1, wherein the signal strength measurements are Mobile Assisted Handoff (MAHO) measurements.

3. The method of claim 1, wherein the attenuation factor comprises the attenuation of the mobile station.

4. The method of claim 1, wherein the global minimum is given as coordinates of the mobile station.

5. A system for mobile station location determination, the system comprising:

a plurality of base stations that:

transmit signals to the mobile station; and a processing unit that:

retrieves received signal strength measurements of signals sent from the plurality of base stations to the mobile station;

retrieves the transmitted signal strength value and the electromagnetic field distribution model function corresponding to each of the plurality of base stations;

sets up an estimation error function with, for each of the plurality of base stations, the transmitted signal strength, received signal strength, and propagation model function, wherein the estimation error function is given by:

$$F(\gamma, x, y) = \sum_{j=1}^{m} M(P_{Rj} - \gamma \cdot P_{Tj} \cdot G_j(x, y))$$

where x and y are coordinates of the mobile station with respect to the base station, m is the number of base stations that the mobile station measured signals from, M is a metric, $P_{Rj}$ is received signal strength, $P_{Tj}$ is transmitted signal strength, $\gamma$ is an attenuation factor and $G_j(x,y)$ is the electromagnetic field distribution model function;

calculates a global minimum of the estimation error function; and communicates the solution to the global minimum.

6. The system of claim 5, wherein the signal strength measurements are Mobile Assisted Handoff (MAHO) measurements.

7. The system of claim 5, wherein the global minimum is given as coordinates of the mobile station.

8. A processing unit for determining mobile station location, comprising:

a communication unit that:

receives received signal strength measurements of signals sent from a plurality of base stations to the mobile station;

forwards the measurements to a processor; and communicates a global minimum; and a processor that, upon reception of the received signal strength measurements and the transmitted signal strength values:

retrieves the transmitted signal strength value and the electromagnetic field distribution model function corresponding to each of the plurality of base stations;

sets up an estimation error function with, for each of the plurality of base stations, the transmitted signal strength, received signal strength, and the electromagnetic field distribution model function, wherein the estimation error function is given by:

$$F(\gamma, x, y) = \sum_{j=1}^{m} M(P_{Rj} - \gamma \cdot P_{Tj} \cdot G_j(x, y))$$

where x and y are coordinates of the mobile station with respect to the base station, m is the number of base stations that the mobile station measured signals from, M is a metric, $P_{Rj}$ is received signal strength, $P_{Tj}$ is transmitted signal strength, $\gamma$ is an attenuation factor and $G_j(x,y)$ is the electromagnetic field distribution model function;

calculates a global minimum of the estimation error function; and sends the solution to the global minimum to the communication unit.

9. The processing unit of claim 8, wherein the signal strength measurements are Mobile Assisted Handoff (MAHO) measurements.

10. The processing unit according to claim 8, wherein the attenuation factor comprises the attenuation of the mobile station.

11. The processing unit according to claim 8, wherein the global minimum is given as coordinates of the mobile station.

* * * * *